(12) United States Patent
Yun et al.

(10) Patent No.: US 12,223,878 B2
(45) Date of Patent: Feb. 11, 2025

(54) ELECTRONIC DEVICE INCLUDING ORGANIC LIGHT EMITTING DISPLAY DEVICE

(71) Applicant: Samsung Electronics Co., Ltd., Suwon-si (KR)

(72) Inventors: Chuleun Yun, Suwon-si (KR); Yunhui Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/480,826

(22) Filed: Oct. 4, 2023

(65) Prior Publication Data

US 2024/0046848 A1 Feb. 8, 2024

Related U.S. Application Data

(63) Continuation of application No. PCT/KR2022/004944, filed on Apr. 6, 2022.

(30) Foreign Application Priority Data

Apr. 28, 2021 (KR) .......................... 10-2021-0055130

(51) Int. Cl.
*G09G 3/20* (2006.01)
*G09G 3/3233* (2016.01)
(Continued)

(52) U.S. Cl.
CPC ......... *G09G 3/2092* (2013.01); *G09G 3/3233* (2013.01); *H02M 1/0045* (2021.05);
(Continued)

(58) Field of Classification Search
CPC ............... G09G 3/2092; G09G 3/3233; G09G 2300/0819; G09G 2300/0842;
(Continued)

(56) References Cited

U.S. PATENT DOCUMENTS 10,372,196 B2   8/2019  Chauhan et al.
10,446,088 B2  10/2019  Lee et al.
(Continued)

FOREIGN PATENT DOCUMENTS

KR     10-0894606 B1    4/2009
KR  10-2014-0055087 A   5/2014
(Continued)

OTHER PUBLICATIONS

International Search Report dated Jul. 26, 2022, issued in International Patent Application No. PCT/KR2022/004944.
(Continued)

*Primary Examiner* — Michael A Faragalla
(74) *Attorney, Agent, or Firm* — Jefferson IP Law, LLP

(57) ABSTRACT

An electronic device including an organic light emitting display device is provided. The electronic device includes the organic light emitting display device and a display power management integrated circuit (PMIC). The organic light emitting display device includes a display panel including a plurality of gate lines, a plurality of data lines, and a plurality of pixels, and a display driver IC (DDI) for driving the display panel. The display PMIC includes a first regulator that outputs a first voltage changed in magnitude from an input voltage input to the display PMIC, and a second regulator that outputs a second voltage phase-inverted and changed in magnitude from the input voltage.

20 Claims, 8 Drawing Sheets

(51) Int. Cl.
  *H02M 1/00* (2006.01)
  *H02M 3/07* (2006.01)
(52) U.S. Cl.
  CPC ...... *H02M 3/07* (2013.01); *G09G 2300/0819* (2013.01); *G09G 2300/0842* (2013.01); *G09G 2330/028* (2013.01); *G09G 2370/00* (2013.01)
(58) Field of Classification Search
  CPC ......... G09G 2330/028; G09G 2370/00; G09G 3/34; G09G 3/20; G09G 3/36; G09G 3/3685; G09G 3/3614; G09G 5/00; H02M 1/0045; H02M 3/07; G06F 1/26
  See application file for complete search history.

(56) References Cited

U.S. PATENT DOCUMENTS

| | | |
|---|---|---|
| 2008/0111811 A1 | 5/2008 | Park |
| 2009/0109147 A1 | 4/2009 | Park et al. |
| 2009/0244110 A1 | 10/2009 | Ogura |
| 2011/0261043 A1 | 10/2011 | Hayakawa et al. |
| 2011/0273422 A1 | 11/2011 | Park |
| 2012/0044273 A1 | 2/2012 | Park et al. |
| 2014/0118413 A1 | 5/2014 | Park |
| 2014/0160182 A1 | 6/2014 | Hong et al. |
| 2016/0173066 A1 | 6/2016 | Yang et al. |
| 2016/0180771 A1 | 6/2016 | Jeong |
| 2017/0038894 A1 | 2/2017 | Jeong et al. |
| 2017/0046004 A1 | 2/2017 | Choi |
| 2017/0243532 A1 | 8/2017 | Huang et al. |
| 2018/0166005 A1* | 6/2018 | Lee ...................... G09G 3/3406 |
| 2018/0300045 A1 | 10/2018 | Surti et al. |
| 2019/0057643 A1 | 2/2019 | Bae et al. |
| 2020/0098297 A1* | 3/2020 | Heo ........................ G09G 3/20 |
| 2021/0012731 A1* | 1/2021 | Shiibayashi ......... G09G 3/3696 |
| 2021/0020137 A1 | 1/2021 | Jang et al. |
| 2021/0383758 A1* | 12/2021 | Yin ...................... G09G 3/3233 |

FOREIGN PATENT DOCUMENTS

| | | |
|---|---|---|
| KR | 10-2016-0071570 A | 6/2016 |
| KR | 10-2016-0074762 A | 6/2016 |
| KR | 10-2017-0098057 A | 8/2017 |
| KR | 10-1887336 B1 | 8/2018 |
| KR | 10-2019-0020579 A | 3/2019 |
| KR | 10-2115530 B1 | 5/2020 |
| KR | 10-2021-0009713 A | 1/2021 |
| KR | 10-2334381 B1 | 12/2021 |

OTHER PUBLICATIONS

European Search Report dated Aug. 8, 2024, issued in European Application No. 22795990.5.

* cited by examiner

ELECTRONIC DEVICE INCLUDING ORGANIC LIGHT EMITTING DISPLAY DEVICE

CROSS-REFERENCE TO RELATED APPLICATION(S)

This application is a continuation application, claiming priority under § 365(c), of an International application No. PCT/KR2022/004944, filed on Apr. 6, 2022, which is based on and claims the benefit of a Korean patent application number 10-2021-0055130, filed on Apr. 28, 2021, in the Korean Intellectual Property Office, the disclosure of which is incorporated by reference herein in its entirety.

BACKGROUND

1. Field

The disclosure relates to an electronic device including an organic light emitting display device. More particularly, the disclosure relates to an electronic device including the organic light emitting display device may include a display power management integrated circuit (PMIC).

2. Description of Related Art

Each of pixels of an organic light emitting display device may include a light emitting element (for example, an organic light emitting diode) having luminance changed by a driving current. Each of the pixels may include a light emitting element, a driving transistor to control a size of a driving current supplied to the light emitting element according to a data voltage, and a switching transistor to provide a data voltage to the driving transistor to control luminance of the light emitting element.

An electronic device including the organic light emitting display device may include a display power management integrated circuit (PMIC). The display PMIC may output driving voltages of various sizes necessary for driving the organic light emitting display device by using an input voltage and an enable signal which are applied from an external device. A voltage generated by the display PMIC may not directly be used for driving the display device. Accordingly, there needs to be voltage processing performed by a display driver integrated circuit (IC) (DDI) in order to drive the display device.

The above information is presented as background information only to assist with an understanding of the disclosure. No determination has been made, and no assertion is made, as to whether any of the above might be applicable as prior art with regard to the disclosure.

SUMMARY

The display PMIC and the display driver IC may include at least one regulator to output driving voltages of various sizes necessary for driving the organic light emitting display device. When a voltage is converted by at least one regulator included in the display PMIC and the display driver IC in order to respond to a power output sequence, a power conversion loss may be caused every time a power conversion process is added, and hence, there may be a problem that power efficiency is reduced.

In addition, since the display driver IC is disposed adjacent to a display panel, there may be a problem that, when heat is generated in the process of converting power through at least one regulator included in the display driver IC, the heat is directly transmitted to a user using the electronic device including the display panel.

Aspects of the disclosure are to address at least the above-mentioned problems and/or disadvantages and to provide at least the advantages described below. Accordingly, an aspect of the disclosure is to provide an electronic device including an organic light emitting display device.

Additional aspects will be set forth in part in the description which follows and, in part, will be apparent from the description, or may be learned by practice of the presented embodiments.

In accordance with an aspect of the disclosure, an electronic device is provided. The electronic device includes an organic light emitting display device including a display panel including a plurality of gate lines, a plurality of data lines, and a plurality of pixels, and a display driver IC (DDI) configured to drive the display panel, and a display power management IC (PMIC) configured to generate a voltage necessary for driving the display driver IC, wherein the display PMIC includes a first regulator configured to output a first voltage resulting from conversion of a size of an input voltage inputted to the display PMIC, and a second regulator configured to output a second voltage resulting from inversion of a phase of the input voltage and conversion of the size, wherein the display driver IC is configured to receive at least one of the first voltage or the second voltage, output, to the display panel, a third voltage in which the phase of the input voltage is maintained based on the first voltage, and output, to the display panel, a fourth voltage in which the phase of the input voltage is inverted based on the second voltage.

In accordance with another aspect of the disclosure, an organic light emitting display device is provided. The organic light emitting display device includes a display panel including a plurality of gate lines, a plurality of data lines, and a plurality of pixels, a display driver IC (DDI) configured to drive the display panel, and a display power management IC (PMIC) configured to generate a voltage necessary for driving the display driver IC, wherein the display PMIC includes a first regulator configured to output a first voltage resulting from conversion of a size of an input voltage inputted to the display PMIC, and a second regulator configured to output a second voltage resulting from inversion of a phase of the input voltage and conversion of the size, wherein the display driver IC is configured to receive at least one of the first voltage or the second voltage, output, to the display panel, a third voltage in which the phase of the input voltage is maintained based on the first voltage, and output, to the display panel, a fourth voltage in which the phase of the input voltage is inverted based on the second voltage.

According to various embodiments of the disclosure, power consumption caused in a process of processing a voltage necessary for driving an organic light emitting display device may be minimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
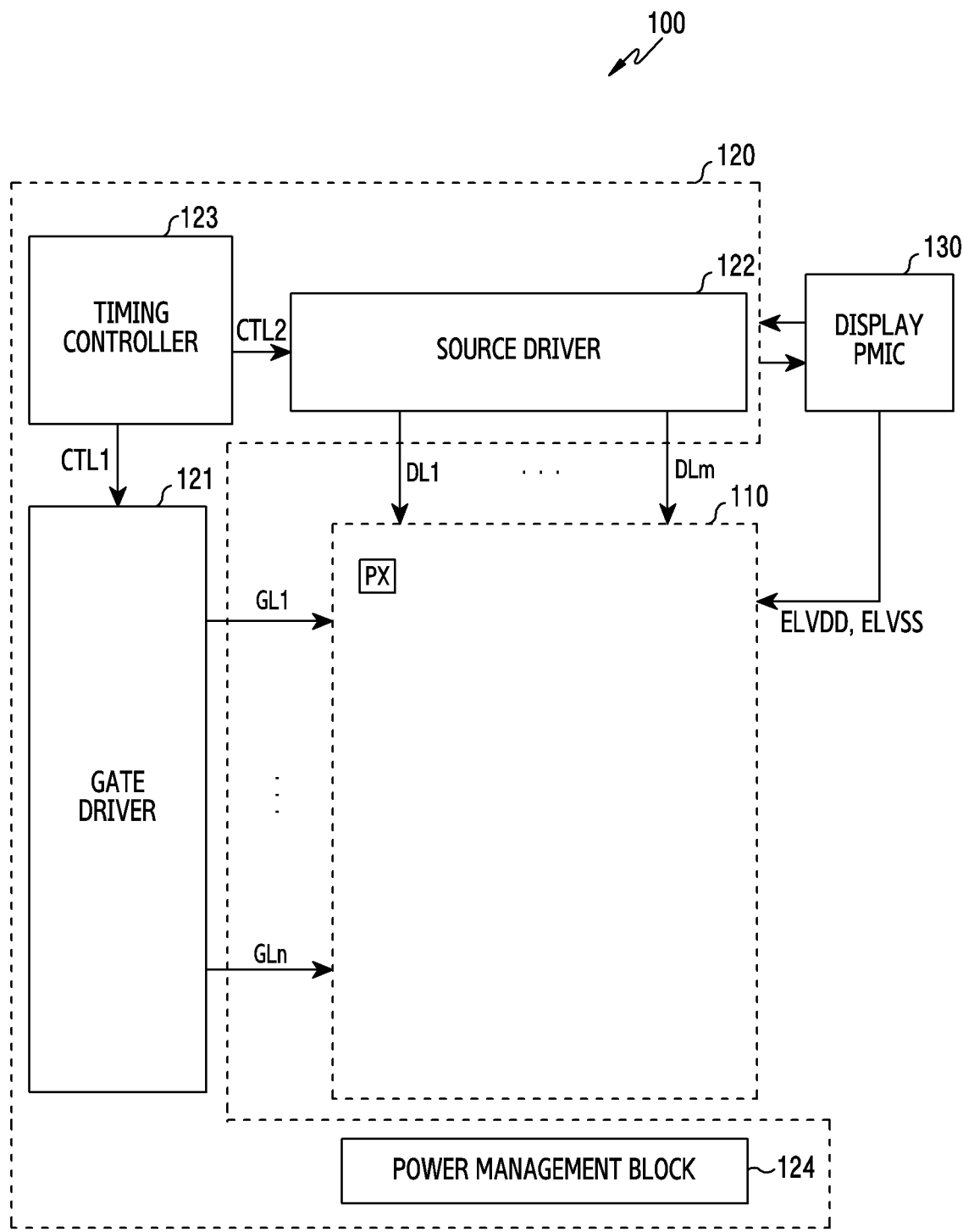
FIG. 1 is a block diagram illustrating an organic light emitting display device according to an embodiment of the disclosure.

FIG. 1 is a block diagram illustrating an organic light emitting display device according to an embodiment of the disclosure.

Referring to FIG. 1, an electronic device 101 may include an organic light emitting display device 100 and a display power management integrated circuit (PMIC) 130.

The organic light emitting display device 100 may include a display panel 110 including a plurality of pixels PX, and a display driver IC (DDI) 120 to drive the display panel 110. In an embodiment of the disclosure, the display driver IC 120 may include a gate driver 121, a source driver 122, and a timing controller 123.

In an embodiment of the disclosure, the display panel 110 may include a plurality of pixels PX to display an image. For example, the display panel 110 may include n*m pixels PX (here, n and m are integers larger than 1) at every intersection of gate lines GL1 to GLn and data lines DL1 to DLm. For example, the pixels PX may be arranged with n pixel rows and m pixel columns. In an example, the display panel 110 may include a self-light emitting display panel emitting light by itself without a backlight unit. The display panel 110 may be an organic light emitting display (OLED) panel. In an example, one pixel PX may include a red sub-pixel, a green sub-pixel, and a blue sub-pixel.

In an embodiment of the disclosure, each pixel PX included in the display panel 110 may have various configurations according to a driving method. For example, the driving method may be divided into an analogue driving method or a digital driving method according to how a gray scale is expressed. A display operating in the analogue driving method may express a gray scale by changing a level of a data voltage applied to a pixel while an organic light emitting diode is emitting light for the same light emitting time. A display operating in the digital driving method may express a gray scale by changing a light emitting time during which a light emitting diode emits light while applying a data voltage of the same level to pixels.

In an embodiment of the disclosure, the pixels PX may be operated in a simultaneous light emitting method. A data signal of a current frame may be applied to a capacitor of a pixel in a light emitting section of a previous frame, and a data signal charged in a capacitor in a recording section of the current frame may be applied to a gate electrode of a driving transistor in a charge share method. Accordingly, a time length of a non-light-emitting section may be reduced.

According to an embodiment of the disclosure, the electronic device (for example, an electronic device 801 of FIG. 8) including the organic light emitting display device 100 may express a gray scale in the analogue or digital driving method. In an example, a structure of the pixel PX will be described with reference to FIG. 2.

In an embodiment of the disclosure, the gate driver 121 may provide a gate signal to the pixels PX through the gate lines GL1 to GLn based on a first control signal CTL1.

In an embodiment of the disclosure, the source driver 122 may convert digital image data into an analogue data voltage (that is, a data voltage Vdata) based on a second control signal CTL2, and may provide a data signal to the pixels PX through the data lines DL1 to DLm. In an embodiment of the disclosure, the source driver 122 may provide the pixels PX with a data signal corresponding to a gate signal which is enabled in at least part of light emitting sections in which pixels emit light.

In an embodiment of the disclosure, the timing controller 123 may control operations of the organic light emitting display device 100. The timing controller 123 may control the operations of the organic light emitting display device 100 by providing predetermined control signals to the gate driver 121, the source driver 122, and the display PMIC 130. In an example, the gate driver 121, the source driver 122, and the timing controller 123 may be implemented by one integrated circuit. In another example, the gate driver 121, the source driver 122, and the timing controller 123 may be implemented by two or more integrated circuits.

In an embodiment of the disclosure, the timing controller 123 may generate first to third control signals CTL1 to CTL3 to control the gate driver 121, the source driver 122, and a power management block 124, respectively. The first control signal CTL1 for controlling the gate driver 121 may include a signal including a vertical initiation signal or a clock signal. The second control signal CTL2 for controlling the source driver 122 may include a horizontal initiation signal, a load signal, or image data. The third control signal CTL3 for controlling the power management block 124 may include a control signal for controlling a voltage level. The timing controller 123 may generate digital image data satisfying an operating condition of the display panel 110 based on input image data, and may provide the digital image data to the source driver 122.

In an embodiment of the disclosure, the timing controller 123 may receive input image data IMG and input control signals CTL from a host device.

In an embodiment of the disclosure, the timing controller 123 may receive image data IMG. The input image data IMG may include red image data R, green image data G, and blue image data B. The image data IMG may include white image data. The image data may include magenta image data, yellow image data, and cyan image data. In the disclosure, a case in which the input image data IMG is red, green, and blue (RGB) data is described, but the input image data IMG may include data of various colors.

In an embodiment of the disclosure, the display driver IC 120 may include the power management block 124.

In an embodiment of the disclosure, the power management block 124 may include a black gray scale voltage VREG, a transistor off voltage VGH, a transistor on voltage VGL, and an initialization voltage VINT.

In an embodiment of the disclosure, the black gray scale voltage VREG may refer to a gray scale voltage V0 that corresponds to a black gray scale among gray scale voltages V0-V255 outputted to the data lines DL1 to DLm of the organic light emitting display device 100 from the display driver IC 120. The other gray scale voltages V1 to V255 may be voltages resulting from division of the black gray scale voltage VREG. However, the other gray scale voltages V1 to V255 may vary according to a nit mode. The number of gray scale voltages V0 to V255 may vary according to a product. For example, the black gray scale voltage VREG may correspond to about 4.5 V to 7.6 V.

In an embodiment of the disclosure, the transistor off voltage VGH or the transistor on voltage VGL may be outputted to the gate driver 121 of the display driver IC 120. The transistor off voltage VGH may be applied to the gate lines GL1 to GLn by the gate driver 121 during a predetermined period. A voltage size of the transistor off voltage VGH will be described below with reference to FIGS. 5 and 6.

In an embodiment of the disclosure, the display driver IC 120 may require an inefficient circuit configuration to generate the black gray scale voltage VREG, the transistor on voltage VGL, the transistor off voltage VGH, or the initialization voltage VINT with only a driving voltage provided thereto. Accordingly, the display PMIC 130 may be included in the organic light emitting display device 100 in order to generate such a high voltage.

In an embodiment of the disclosure, the display PMIC 130 may generate a first power voltage ELVDD to be applied to a first power voltage line, and a second power voltage ELVSS to be applied to a second power voltage line. The first power voltage ELVDD and the second power voltage ELVSS may be supplied to the display panel 110 and may be used for generating a driving current of the organic light emitting diode.

In an embodiment of the disclosure, the display PMIC 130 may generate a base voltage VLIN of the display driver IC 120 and may provide the base voltage to the display driver IC 120. The base voltage VLIN may be a high voltage that is used for generating the black gray scale voltage VREG, the transistor off voltage VGH, and the transistor on voltage VGL at the display driver IC 120.

In an embodiment of the disclosure, the power management block 124 may provide the transistor off voltage VGH, the transistor on voltage VGL, and the initialization voltage VINT to the pixel PX based on the third control signal CTL3. For example, the power management block 124 may include at least one regulator to generate output voltages of various voltage levels from a voltage supplied from the display PMIC 130.

In an embodiment of the disclosure, the display PMIC 130 may include a direct current (DC)-DC converter to generate output voltages of various voltage levels from an input voltage (a battery voltage).

In an embodiment of the disclosure, the initialization voltage VINT may initialize an amount of charge accumulated in an organic light emitting diode. In an example, the initialization voltage VINT may be applied to a gate electrode of a transistor to initialize an amount of charge. The initialization voltage VINT is not necessarily a fixed potential. In an example, the initialization voltage VINT may include a positive initialization voltage VINT_P and/or a negative initialization volt VINT_N. A light emitting control signal of a turn off level may be applied through the gate driver 121, and the initialization voltage VINT may be applied through the gate driver 121. The initialization voltage VINT may be transmitted to an anode of a light emitting element (EL) to initialize an amount of charge accumulated in the light emitting element (EL). In an embodiment of the disclosure, the initialization voltage VINT may initialize major nodes of a pixel circuit and may be set to be lower than a data voltage Vdata and lower than a threshold voltage Vth of the light emitting element (EL) to suppress light emission of the light emitting element (EL) and to initialize the major nodes of the pixel.

Figure 2:
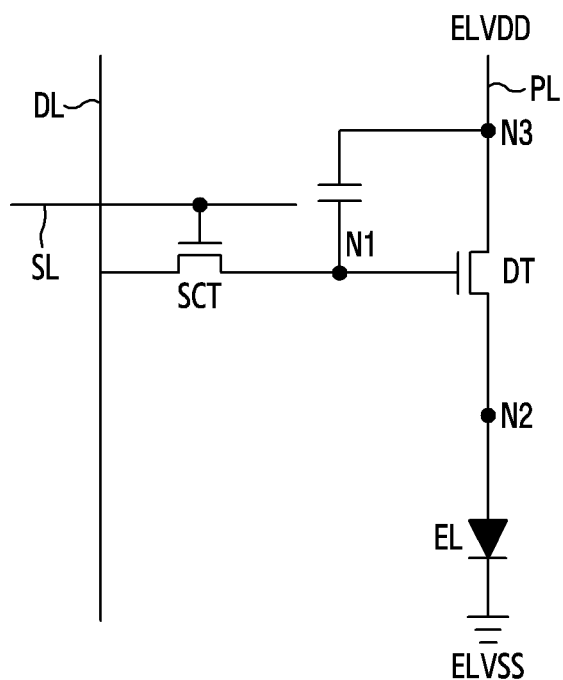
FIG. 2 is an equivalent circuit diagram illustrating a pixel (PX) included in an organic light emitting display device according to an embodiment of the disclosure.

FIG. 2 is an equivalent circuit diagram illustrating a pixel PX included in an organic light emitting display device according to an embodiment of the disclosure.

Referring to FIG. 2, each pixel PX of a plurality of pixels PX arranged on a display panel (for example, the display panel 110 of FIG. 1) may include a light emitting element EL, two transistors and a storage capacitor Cst. Such a sub-pixel structure is referred to as a 2 transistor (2T) 1 capacitor (1C) structure.

In an embodiment of the disclosure, the two transistors DT, SCT may include a driving transistor DT and a scan transistor SCT.

In an embodiment of the disclosure, the light emitting element EL may include a first electrode and a second electrode, and a light emitting layer. In an example, the first electrode may be an anode electrode or a cathode electrode, and the second electrode may be a cathode or anode electrode. The first electrode of the light emitting element EL may be an anode electrode corresponding to an electrode the exists at every pixel PX, and the second electrode may be a cathode electrode which corresponds to a common electrode and to which a second power voltage EVLSS is applied. In an example, the light emitting layer may be disposed between the first electrode and the second electrode.

In an embodiment of the disclosure, the driving transistor DT may be a transistor for driving the light emitting element EL, and may include a first node N1, a second node N2, and a third node N3. In an example, the first node N1 of the driving transistor DT may be a gate node and may be electrically connected with a source node or a drain node of the scan transistor SCT. The second node N2 of the driving transistor DT may be a source node or a drain node, and may be electrically connected with the first electrode of the light emitting element EL. The third node N3 of the driving transistor DT may be electrically connected with a first power voltage line which supplies the first power voltage ELVDD.

In an embodiment of the disclosure, the driving transistor DT may be connected with a driving voltage line PL, and may control a driving current flowing from the driving voltage line PL to the light emitting element EL in response to a value of a voltage stored in the storage capacitor Cst. In an example, the light emitting element EL may emit light having predetermined luminance to the outside by the driving current.

In an embodiment of the disclosure, the scan transistor SCT may be turned on or turned off according to a gate signal supplied from a gate line GL to control connection between a data line DL and the first node N1 of the driving transistor DT. In an example, the scan transistor SCT may be turned on by a gate signal having a transistor on voltage VGL to transmit a data voltage Vdata supplied from the data line DL to the first node N1 of the driving transistor DT.

In an embodiment of the disclosure, the storage capacitor Cst may be connected between the first node N1 and the third node N3 of the driving transistor DT. The storage capacitor Cst may be charged with an amount of charge corresponding to a difference between voltages of both ends, and may serve to maintain the difference between the voltages of both ends for a defined frame time. Accordingly, a corresponding pixel may emit light for the defined frame time.

In an embodiment of the disclosure, the equivalent circuit diagram of the pixel PX included in the display panel 110 in FIG. 2 has been described as including two transistors and one storage capacitor, but the disclosure is not limited thereto. For example, the equivalent circuit diagram may include a plurality of transistors and two or more transistors.

Figure 3:
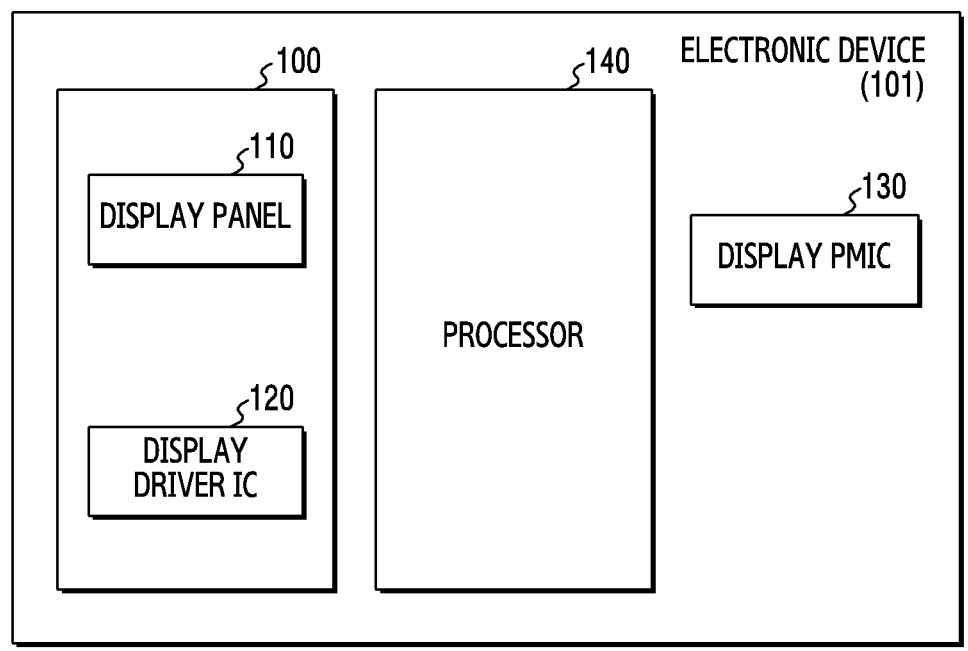
FIG. 3 is a block diagram illustrating an electronic device according to an embodiment of the disclosure.

FIG. 3 is a block diagram of an electronic device according to an embodiment of the disclosure.

Referring to FIG. 3, the electronic device 101 may include the organic light emitting display device 100, a display power management circuit (PMIC) 130, and a processor 140. In an example, the organic light emitting display device 100 may include the display panel 110 and a display drive IC (DDI) 120.

In an embodiment of the disclosure, the electronic device 101 may be implemented by omitting some components or may be implemented by further including a component that is not illustrated. For example, the electronic device 101 may further include a communication circuit, a touch sensor, and/or a memory.

In an embodiment of the disclosure, the display panel 110 may output image data through the display driver IC 120. In an example, the display panel 110 may include an organic LED (OLED) display panel or an active-matrix organic LED (AMOLED) display panel. In an example, the display panel 110 may include a flexible display.

In an embodiment of the disclosure, the display panel 110 may include a plurality of pixels PX. In an example, one pixel PX circuit may include a light emitting element EL, at least one transistor, and at least one capacitor.

In an embodiment of the disclosure, the display panel 110 may be electrically connected with the display driver IC 120 or the display PMIC 130. In an example, the display panel 110 may include a connection terminal to be electrically connected with the display driver IC 120 or the display PMIC 130. The display panel 110 may receive a power from the display driver IC 120 or the display PMIC 130 through the connection terminal. When the power is supplied to the display panel 110, a current may flow through a light emitting diode included in at least one designated pixel PX according to a data signal transmitted from the display driver IC 120. When the current flows, the light emitting diode may emit light and may provide information to a user through the organic light emitting display device 100.

In an embodiment of the disclosure, the display PMIC 130 may be electrically connected with the display panel 110, the display driver IC 120, and the processor 140.

In an embodiment of the disclosure, the display PMIC 130 may include a short detection function. The short detection function may be a function that forcedly shuts off power supply from the display PMIC 130 when a current of a designated size or larger is detected in the light emitting element EL included in the display panel 110. The display PMIC 130 may prevent an element included in the display panel 110 from being damaged by a short current through the short detection function.

In an embodiment of the disclosure, the display PMIC 130 may generate power necessary for the display panel 110 and the display driver IC 120 by using a DC-DC converter (or at least one regulator). In an example, the display PMIC 130 may include at least one regulator (for example, a first regulator 221 and/or a second regulator 222 of FIG. 5) for converting an input power into a designated value. In an example, the display PMIC 130 may receive a power through an external power source (for example, a battery or a travel adapter (TA)). In an example, at least one regulator included in the display PMIC 130 may include an amplification stage formed of at least one step. In an example, at least one regulator included in the display PMIC 130 may output at least one power according to the amplification stage formed of the at least one step. For example, the at least one regulator may output a first power and/or a second power different from the first power. In an example, the PMIC 130 may supply the first power and/or the second power outputted through the at least one regulator to the display driver IC 120.

In an embodiment of the disclosure, the display PMIC 130 may receive a control signal CTRL from the processor 140. In an example, the control signal CTRL may include selection information on the at least one regulator and information on a power to be outputted from the at least one regulator. In an example, the processor 140 may be disposed in the display driver IC 120, but this should not be considered as limiting.

In an embodiment of the disclosure, the display driver IC 120 may be electrically connected with the display panel 110, the display PMIC 130, and the processor 140. In an example, the display driver IC 120 may convert data transmitted from the processor 140 into such a form that the data is transmitted to the display panel 110, and may transmit the converted data (or display data) to the display panel 110. In an example, the converted data may be transmitted in the unit of pixel PX.

Figure 5:
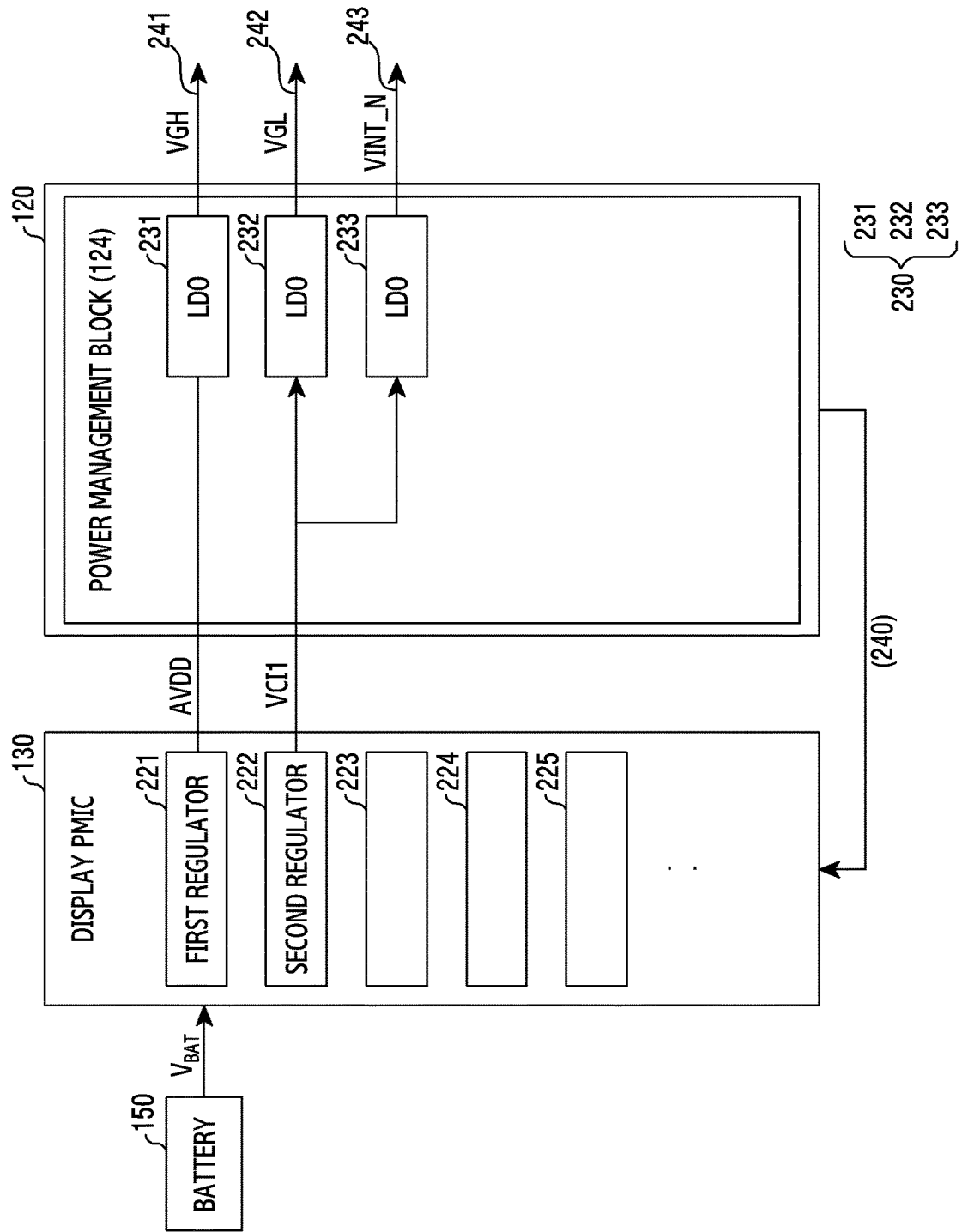
FIG. 5 is a view illustrating a display driver IC and a display PMIC which supply power to a display panel according to an embodiment of the disclosure.

In an embodiment of the disclosure, the display driver IC 120 may include at least one regulator (for example, a third regulator 230 of FIG. 5). In an example, the at least one regulator included in the display driver IC 120 may include a low voltage drop-out (LDO). In an example, the display driver IC 120 may receive a power from the display PMIC 130 and may convert the received power into an appropriate power value through the at least one regulator. In an example, the power value converted through the at least one regulator included in the display driver IC 120 may include at least one of a transistor off voltage VGH, a transistor on voltage VGL, or an initialization voltage VINT.

In an embodiment of the disclosure, the processor 140 may be electrically connected with the display panel 110, the display driver IC 120 and/or the display PMIC 130.

In an embodiment of the disclosure, the processor 140 may supply a power to the display PMIC 130 through a battery (for example, a battery 889 of FIG. 8) when the organic light emitting display device 100 is turned on. The processor 140 may supply a power to the display PMIC 130 by another external power (travel adapter (TA)) signal in addition to the battery.

In an embodiment of the disclosure, the processor 140 may transmit a control signal for generating a driving voltage AVDD and a first intermediate voltage VCI1 (or a pump voltage Vpump) to the display PMIC 130 which receives the power. In an example, the driving voltage AVDD and the first intermediate voltage VCI1 (or the pump voltage Vpump) outputted from the display PMIC 130 may have different phases and/or sizes according to a voltage generated through the at least one regulator included in the display driver IC 120.

In an embodiment of the disclosure, the display PMIC 130 may convert the received voltage into the driving voltage AVDD and the first intermediate voltage VCI1 (or the pump voltage Vpump) which are generated by the control signal through the at least one regulator.

In an embodiment of the disclosure, the display PMIC 130 may supply the converted driving voltage AVDD and first intermediate voltage VCI1 (or pump voltage Vpump) to the display driver IC 120.

In an embodiment of the disclosure, the display driver IC 120 may convert the driving voltage AVDD supplied from the display PMIC 130 into a transistor off voltage VGH through the at least one regulator. In an example, the display driver IC 120 may convert the first intermediate voltage VCI1 (or the pump voltage Vpump) supplied from the display PMIC 130 into a transistor on voltage VGL or a negative initialization voltage VINT_N through the at least one regulator.

In an embodiment of the disclosure, the display driver IC 120 may transmit the transistor on voltage VGL, the transistor off voltage VGH, and the negative initialization voltage VINT_N, which are converted, to the gate driver 121.

Figure 4:
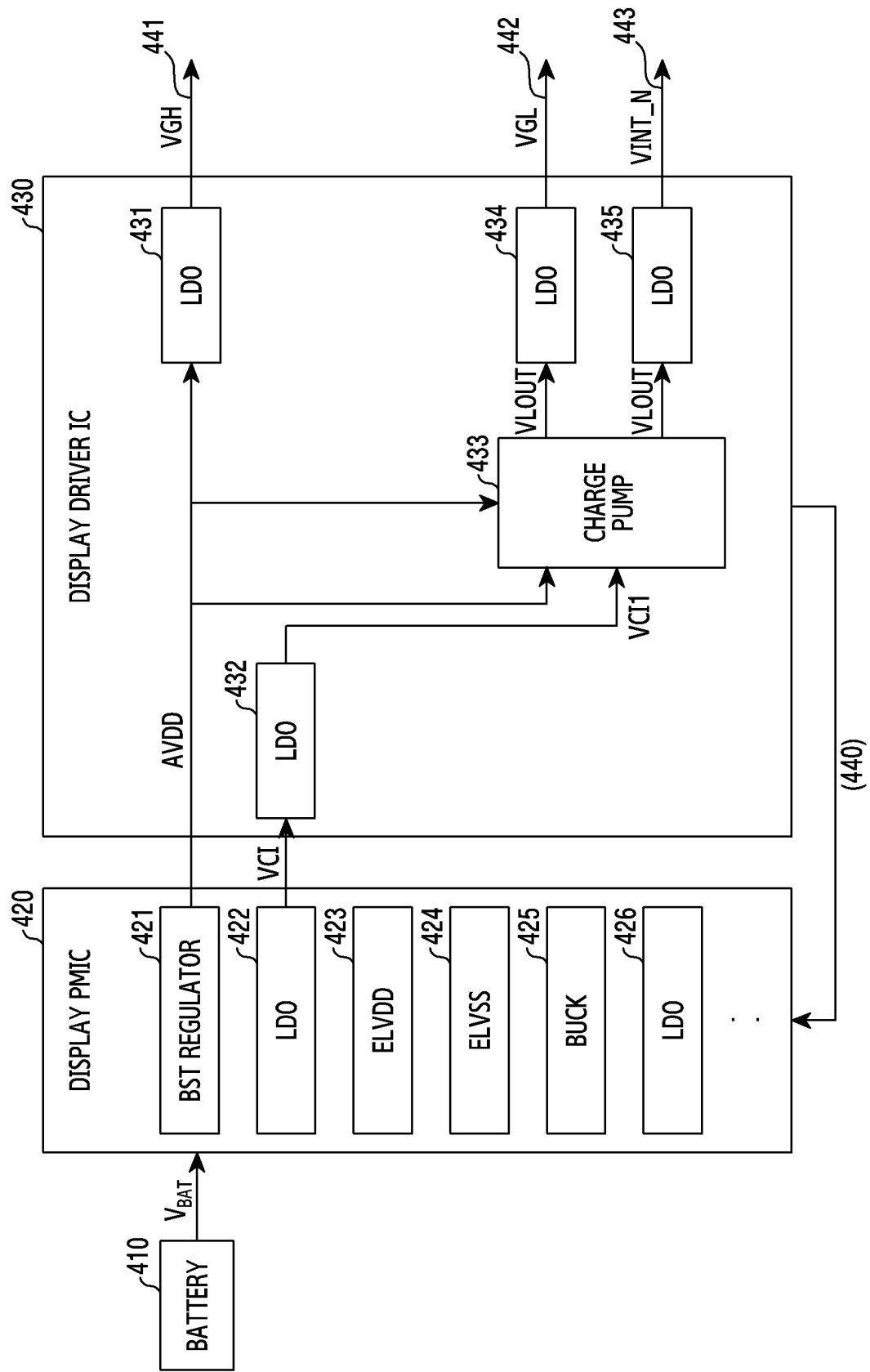
FIG. 4 is a view illustrating a display driver integrated circuit (IC) and a display power management IC (PMIC) which supply power to a display panel according to an embodiment of the disclosure.

FIG. 4 illustrates a display driver IC and a display PMIC which supply a power to a display panel according to an embodiment of the disclosure.

Referring to FIG. 4, a display PMIC 420 may include at least one regulator.

The display PMIC 420 may include a boost regulator 421 and an LDO regulator 422. The display PMIC 420 may further include a regulator 423 to generate a first power voltage ELVSS, a regulator 424 to generate a second power voltage ELVDD, and at least one regulator to supply a voltage to another circuit disposed in a display driver IC 430, in addition to the boost regulator 421 and the LDO regulator 422. The at least one regulator may include a buck regulator 425 and/or a low voltage dropout (LDO) regulator 426.

The display driver IC 430 may include a first LDO regulator 431, a second LDO regulator 432, a third LDO regulator 434, a fourth LDO regulator, and a charge pump 433.

The display PMIC 420 may receive a battery voltage Vbat from a battery 410. In another example, the display PMIC 420 may receive a voltage through an external power source besides the battery 410.

The boost regulator 421 may output a driving voltage AVDD by stepping up the battery voltage Vbat. For example, the battery voltage Vbat inputted to the boost regulator 421 may be about 3.0 V to 4.4 V and the driving voltage AVDD may correspond to about 7.8 V.

The driving voltage AVDD generated from the boost regulator 421 may be supplied to the first LDO regulator 431 of the display driver IC 430, or may be supplied to the charge pump 433.

When the driving voltage AVDD generated from the boost regulator 421 is supplied to the first LDO regulator 431, the first LDO regulator 431 may receive the driving voltage AVDD and may generate a transistor off voltage VGH. In an example, the first LDO regulator 431 may output the transistor off voltage VGH by stepping down the driving voltage AVDD. For example, the driving voltage AVDD may be about 7.8 V and the transistor off voltage VGH 441 may correspond to about 5.1 V to about 7.8 V.

The LDO regulator 422 of the display PMIC 420 may generate an input voltage VCI to be inputted to the second LDO regulator 432 by stepping down the battery voltage Vbat inputted to the LDO regulator 422. For example, the battery voltage Vbat inputted to the LDO regulator 422 may be about 3.0 V, and the input voltage VCI may correspond to about 3.0 V.

The input voltage VCI generated from the LDO regulator 422 may be supplied to the second LDO regulator 432 of the display driver IC 430.

When the input voltage VCI generated from the LDO regulator 422 is supplied to the second LDO regulator 432 of the display driver IC 430, the second LDO regulator 432 may receive the input voltage VCI and may generate a first intermediate voltage VCI1. For example, the input voltage VCI may be about 3.0 V, and the first intermediate voltage VCI1 may correspond to about 2.2 V to 3.0 V.

The display driver IC 430 may include the charge pump 433. The charge pump 433 may include a negative charge pump. In an example, the charge pump (negative charge pump) 433 may receive the driving voltage AVDO which is generated from the boost regulator 421 included in the display PMIC 420, and the first intermediate voltage VCI1 which is generated from the second LDO regulator 432 included in the display driver IC 430.

The charge pump 433 may generate a negative voltage VLOUT which is a negative voltage of a sum of the driving voltage AVDD and the first intermediate voltage VCI1. For example, when the driving voltage AVDD is about 7.8 V and the first intermediate voltage VCI1 corresponds to about 2.2 V to 3.0, the negative voltage VLOUT generated from the charge pump 433 may correspond to about −10.0 V to 10.8 V.

The negative voltage VLOUT generated from the charge pump 433 may be supplied to the third LDO regulator 434 and/or the fourth LDO regulator 435.

The third LDO regulator 434 may generate a transistor on voltage VGL 442 by stepping down the voltage supplied to the third regulator 434. For example, the transistor on voltage VGL 442 may correspond to about −4.0 V to −9.75V.

The fourth LDO regulator 435 may generate a negative initialization voltage VINT_N 443 by stepping down the voltage supplied to the fourth regulator 435. For example, the negative initialization voltage VINT_N 443 may correspond to about −5.0 V to 0.0.

The transistor off voltage VGH 441, the transistor on voltage VGL 442, and/or the negative initialization voltage VINT_N 443 which are generated from the display driver IC 430 may be delivered to a gate driver.

The display driver IC 430 may include at least the second LDO regulator 432, the third LDO regulator 434, the fourth LDO regulator 435 and the charge pump 433 in order to generate the transistor on voltage VGL 442 and/or the negative initialization voltage VINT_N 443. In an example, The display driver IC 430 may transmit, to the display PMIC 420 through a communication circuit 440.

FIG. 5 illustrates a display driver IC and a display PMIC which supply a power to a display panel according to an embodiment of the disclosure.

Referring to FIG. 5, the display PMIC 130 may include the first regulator 221 and a second regulator 222. The display PMIC 130 is not limited thereto and may further include a regulator 223 to generate a first power voltage ELVSS, a regulator 224 to generate a second power voltage ELVDD, and at least one regulator 225 to supply a voltage to another circuit disposed in the display driver IC 120.

In an embodiment of the disclosure, the display driver IC 120 may include the power management block 124. The power management block 124 may include at least one regulator 230. The at least one regulator 230 may include a first LDO regulator 231, a second LDO regulator 232, and a third LDO regulator 233.

In an embodiment of the disclosure, the display PMIC 130 may receive a battery voltage Vbat from a battery 150. In another example, the display PMIC 130 may receive a voltage through an external power source in addition to the battery 150.

In an embodiment of the disclosure, the first regulator 221 of the display PMIC 130 may include a boost regulator. In an example, the boost regulator may be a converter to step up an input voltage.

In an embodiment of the disclosure, the second regulator 222 of the display PMIC 130 may include at least one of a buck-boost converter or a Cuk converter. The buck-boost converter may be a converter that incorporates a buck converter and a boost converter. The buck converter may be a step-down converter that converts an input voltage into an output voltage lower than the input voltage. The boost converter may be a step-up converter that converts an input voltage into an output voltage higher than the input voltage. In an example, the second regulator 222 may be a converter that inverts a phase of an input voltage and steps up or down the input voltage.

In an embodiment of the disclosure, a processor (for example, the processor 140 of FIG. 3) may be disposed in the display driver IC 120 or may be disposed in a separate circuit. In an example, the processor 140 may transmit, to the display PMIC 130 through a communication circuit 240, a control signal related to a driving voltage AVDD and a first intermediate voltage VCI1 to be supplied to the display driver IC 120. The communication circuit 240 may use an inter-integrated circuit (I2C) communication method.

In an embodiment of the disclosure, the first regulator 221 of the display PMIC 130 may receive a battery voltage Vbat through the battery 150. In an example, the display PMIC 130 may receive the control signal related to the driving voltage AVDD from the processor (for example, the processor 140 of FIG. 3). The display PMIC 130 may output the driving voltage AVDD through the first regulator 221 based on the received control signal related to the driving voltage AVDD. In an example, the first regulator 221 may output the driving voltage AVDD by stepping up the received battery voltage Vbat. For example, the battery voltage Vbat inputted to the first regulator 221 may be about 3.0 V, and the driving voltage AVDD may correspond to about 5.0 V to 7.8 V.

In an embodiment of the disclosure, the second regulator 222 of the display PMIC 130 may receive the battery voltage Vbat through the battery 150. The second regulator 222 may invert the phase of the received battery voltage Vbat, and may step up or down the voltage of the received battery voltage Vbat.

In an embodiment of the disclosure, the display PMIC 130 may receive the control signal related to the first intermediate voltage VCI1 from the processor 140. The display PMIC 130 may output the first intermediate voltage VCI1 through the second regulator 222 based on the received control signal related to the first intermediate voltage VCI1. The second regulator 222 may invert the phase of the inputted battery voltage Vbat, and may generate the second intermediate voltage VCI1 by stepping down or up the battery voltage Vbat. The first intermediate voltage VCI1 outputted through the second regulator 222 may be supplied to the display driver IC 120. In an example, when the battery voltage Vbat is a positive voltage, the first intermediate voltage VCI1 may be a negative voltage. For example, the battery voltage Vbat inputted to the second regulator 222 may be about 3.0 V, and the first intermediate voltage VCI1 may be about −10.8 V to −5.0 V.

In an embodiment of the disclosure, the first intermediate voltage VCI1 outputted from the second regulator 222 of the display PMIC 130 may be supplied to the second LDO regulator 232 and/or the third LDO regulator 233 of the display driver IC 120.

In an embodiment of the disclosure, the first intermediate voltage VCI1 inputted to the second LDO regulator 232 may be converted into a transistor on voltage VGL. In an example, the second LDO regulator 232 may generate the transistor on voltage VGL 242 by stepping down the first intermediate voltage VCI1 received through the second regulator 222 of the display PMIC 130. In an example, the transistor on voltage VGL outputted from the second LDO regulator 232 may correspond to a negative voltage.

In an embodiment of the disclosure, the display driver IC 120 may receive a control signal related to the transistor on voltage VGL 242 through the processor (for example, the processor 140 of FIG. 3). In an example, the display driver IC 120 may generate the transistor on voltage VGL 242 through the second LDO regulator 232 based on control information related to the transistor on voltage VGL, which is received through the processor 140. For example, the first intermediate voltage VCI1 supplied to the second LDO regulator 232 may be about −10.8V to −5.0 V, and the outputted transistor on voltage VGL 242 may correspond to about −9.75 V to −4.0 V.

In an embodiment of the disclosure, a negative initialization voltage VINT_N may be outputted through the third LDO regulator 233. In an example, the third LDO regulator 233 may generate the negative initialization voltage VINT_N 243 by stepping down the first intermediate voltage VCI1 received through the second regulator 222 of the display PMIC 130. In an example, the negative initialization voltage VINT_N outputted from the third LDO regulator 233 may correspond to a negative voltage.

In an embodiment of the disclosure, the display driver IC 120 may receive control information related to the negative initialization voltage VINT_N through the processor 140. In an example, the display driver IC 120 may generate the negative initialization voltage VINT_N through the third LDO regulator 233 based on the control information related to the negative initialization voltage VINT_N, which is received through the processor 140. For example, the first intermediate voltage VCI1 supplied to the third LDO regulator 233 may be about −10.8 V to −5.0 V, and the outputted negative initialization voltage VINT_N may correspond to −5.0 V to 0.0 V.

In an embodiment of the disclosure, the display driver IC 120 may include at least the second LDO regulator 232 and the third LDO regulator 233 in order to output the transistor on voltage VGL 242 and the negative initialization voltage VINT_N 243.

Figure 6:
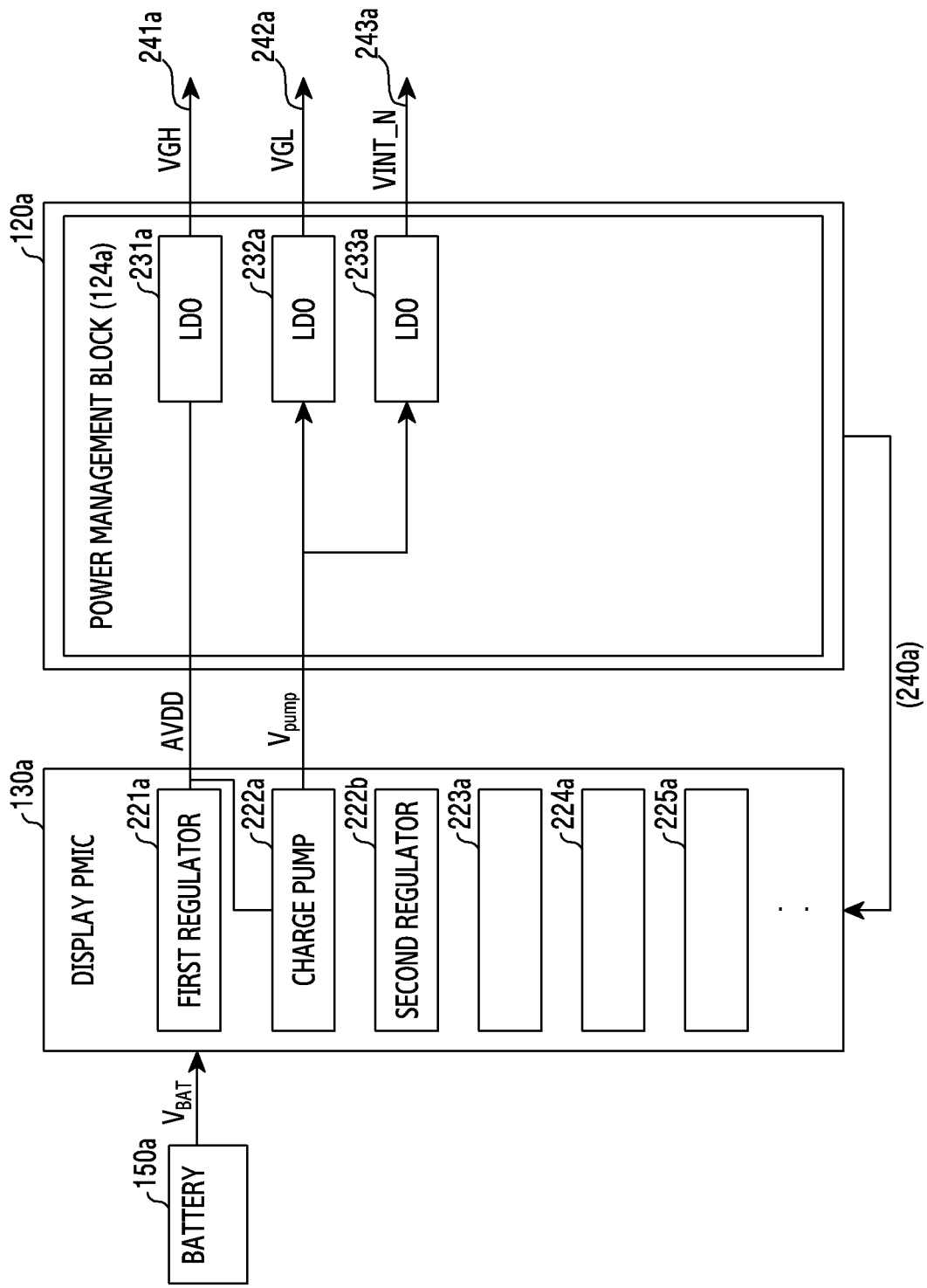
FIG. 6 is a view illustrating a display driver IC and a display PMIC which supply power to a display panel according to an embodiment of the disclosure.

FIG. 6 illustrates a display driver IC and a display PMIC which supply a power to a display panel according to an embodiment of the disclosure.

Referring to FIG. 6, the display PMIC 130a may include a first regulator 221a, a charge pump 222a, and a second regulator 222b. The display PMIC 130a of FIG. 6 may be the display PMIC 130 of FIG. 5 that includes the charge pump 222a, and the configuration other than the charge pump 222a may be equally applied. Specifically, for example, the display PMIC 130a may further include a regulator 223a to generate a first power voltage ELVSS, a regulator 224a to generate a second power voltage ELVDD, and at least one regulator 225a to supply a voltage to another circuit disposed in a display driver IC 120a.

In an embodiment of the disclosure, the display driver IC 120a may include the power management block 124a. The power management block 124a may include at least one regulator, which may include a first LDO regulator 231a, a second LDO regulator 232a, and a third LDO regulator 233a in order to output the transistor on voltage VGL 242a and the negative initialization voltage VINT_N 243a.

In an embodiment of the disclosure, the charge pump 222a may invert a phase of an input voltage inputted to the charge pump 222a. For example, when the input voltage inputted to the charge pump 222a is a positive voltage, an output voltage outputted through the charge pump 222a may be a negative voltage.

In an embodiment of the disclosure, the display PMIC 130a may receive a control signal related to a driving voltage AVDD to be outputted from the first regulator 221a from a processor (for example, the processor 140 of FIG. 3).

In an embodiment of the disclosure, the display PMIC 130a may receive a control signal related to a first intermediate voltage VCI1 to be outputted from the second regulator 222b from the processor 140.

In an embodiment of the disclosure, the processor 140 may compare a size of the driving voltage AVDD to be outputted from the first regulator 221a and a size of the first intermediate voltage VCI1 to be outputted from the second regulator 222b. In an example, when the size of the driving voltage AVDD to be outputted from the first regulator 221a and the size of the first intermediate voltage VCI1 to be outputted from the second regulator 222b are the same, the second regulator 222b may be disabled and the charge pup 222a may be enabled.

In an embodiment of the disclosure, the driving voltage AVDD generated through the first regulator 221a may be supplied to the charge pump 222a. When the driving voltage AVDD generated from the first regulator 221a is supplied to the charge pump 222a, the charge pump 222a may invert the phase of the supplied driving voltage AVDD to generate a pump voltage Vpump having the same size as the size of the supplied driving voltage AVDD.

In an embodiment of the disclosure, the pump voltage Vpump outputted from the charge pump 222a may be supplied to a second LDO regulator 232a and a third LDO regulator 233a of the display driver IC 120.

In an embodiment of the disclosure, the second LDO regulator 232a may generate a transistor on voltage VGL by stepping down the pump voltage Vpump supplied from the charge pump 222a of the display PMIC 130a.

In an embodiment of the disclosure, the third LDO regulator 233a may generate a negative initialization voltage VINT_N by stepping down the pump voltage Vpump supplied from the charge pump 222a of the display PMIC 130a.

In an embodiment of the disclosure, the transistor on voltage VGL generated through the second LDO regulator 232a and/or the negative initialization voltage VINT_N generated through the third LDO regulator 233a may be supplied to a gate driver (for example, the gate driver 121). In an example, The display driver IC 120a may transmit, to the display PMIC 130a through a communication circuit 240a.

Figure 7:
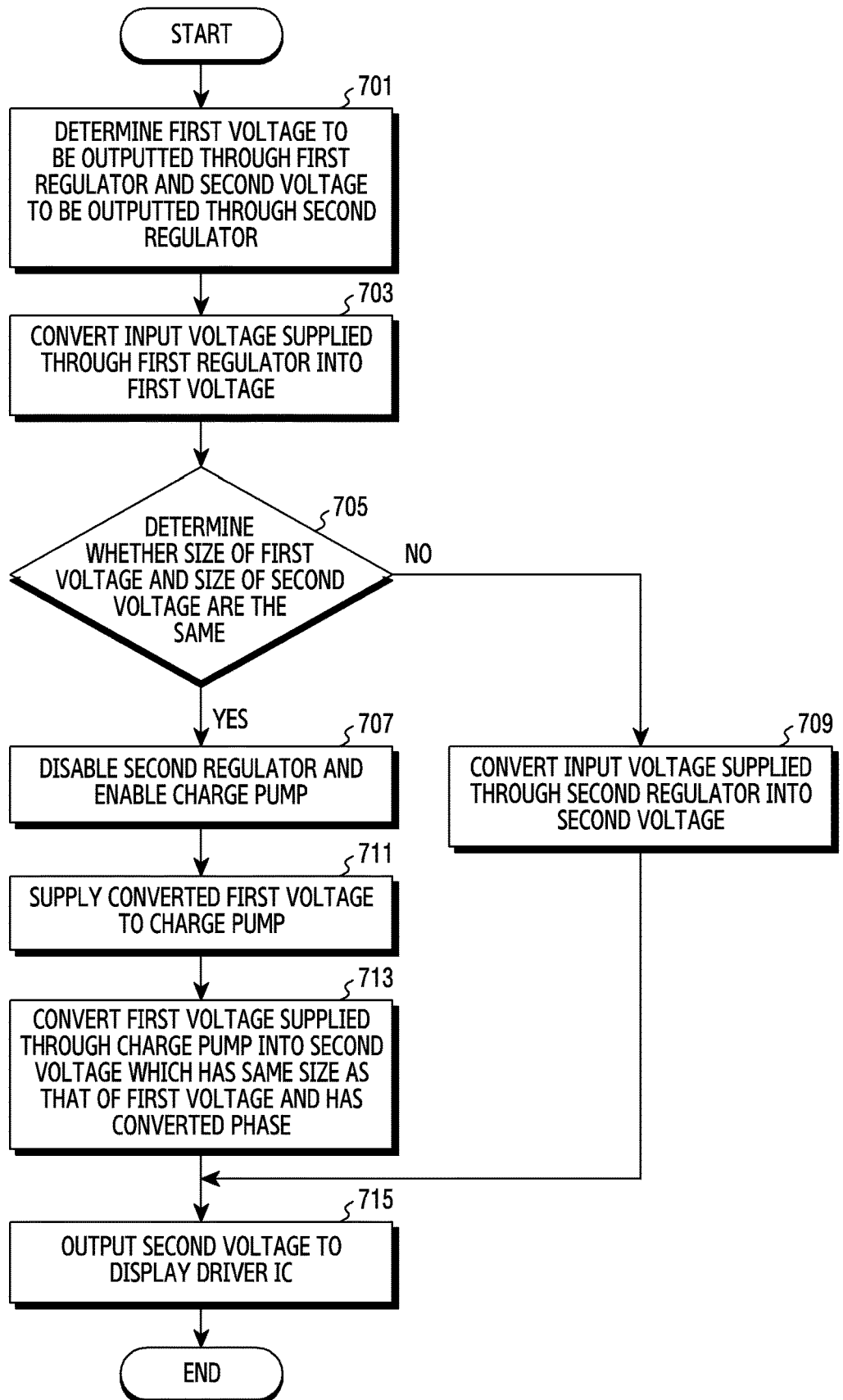
FIG. 7 is a sequence diagram illustrating an operating process of an organic light emitting display device which supplies power to a display panel according to an embodiment of the disclosure.

FIG. 7 is a sequence diagram 700 illustrating an operating process of an organic light emitting display device which supplies a power to a display panel according to an embodiment of the disclosure.

Referring to FIG. 7, according to an embodiment of the disclosure, in operation 701, the organic light emitting display device 100 (for example, a processor (for example, the processor 140 of FIG. 3)) may determine a first voltage to be outputted through a first regulator 221a and a second voltage to be outputted through a second regulator 222b.

In an embodiment of the disclosure, the first regulator 221a and the second regulator 222b may be included in a display PMIC 130a.

In an embodiment of the disclosure, the first voltage outputted through the first regulator 221a may be a driving voltage AVDD which is supplied to a display driver IC 120a. In an example, the first voltage outputted through the first regulator 221a may be supplied to the first LDO regulator 231a which outputs a transistor off voltage VGH 241a. In an example, the first voltage outputted through the first regulator 221a may be a voltage having the same phase as that of an input voltage supplied to the first regulator 221a.

In an embodiment of the disclosure, the second voltage outputted through the second regulator 222b may be a first intermediate voltage VCI1 which is supplied to the display driver IC 120a. The second voltage outputted through the second regulator 222b may be supplied to a second LDO regulator 232a which outputs a transistor on voltage VGL 242, and/or a third LDO regulator 233a which outputs a negative initialization voltage VINT_N 243. In an example, since the second regulator 222a inverts a phase of an input voltage and steps up or down a voltage, the second regulator 222b may invert the phase of the input voltage supplied to the second regulator 222a, and may step up or down the input voltage. Accordingly, when the input voltage supplied to the second regulator 222b is a positive voltage, the second voltage outputted from the second regulator 222a may be a voltage that has the opposite phase to that of the input voltage supplied to the second regulator 222b.

According to an embodiment of the disclosure, in operation 703, the organic light emitting display device 100 (for example, the processor (for example, the processor 140 of FIG. 3)) may convert an input voltage supplied through the first regulator 221a into the first voltage.

In an example, the first regulator 221a may include a boost regulator. The first regulator 221a may convert the input voltage into the first voltage by stepping up the input voltage. In an example, the first voltage outputted from the first regulator 221a may have the same phase as that of the voltage inputted to the first regulator 221a.

According to an embodiment of the disclosure, in operation 705, the organic light emitting display device 100 (for example, the processor (for example, the processor 140 of FIG. 3)) may determine whether a size of the first voltage and a size of the second voltage are the same.

In an embodiment of the disclosure, the size of the first voltage outputted through the first regulator 221a and the size of the second voltage outputted through the second regulator 222b may be the same as each other, but the first voltage outputted through the first regulator 221a and the second voltage outputted through the second regulator 222b may have the opposite phases.

According to an embodiment of the disclosure, when the size of the first voltage outputted through the first regulator 221a and the size of the second voltage outputted through the second regulator 222b are not the same (No in operation 705), the organic light emitting display device 100 (for example, the processor (for example, the processor 140 of FIG. 3)) may convert an input voltage supplied through the second regulator 222b into the second voltage in operation 709 which has a different size from the size of the first voltage. In an example, the input voltage supplied to the second regulator 222b may be a battery voltage Vbat which is supplied from a battery.

According to an embodiment of the disclosure, when the size of the first voltage outputted through the first regulator 221a and the size of the second voltage outputted through the second regulator 222b are the same (Yes in operation 705), the organic light emitting display device 100 (for example, the processor (for example, the processor 140 of FIG. 3)) may disable the second regulator 222b and may enable a charge pump 222a in operation 707.

According to an embodiment of the disclosure, in operation 711, the organic light emitting display device 100 (for example, the processor (for example, the processor 140 of FIG. 3)) may supply the first voltage converted through the first regulator 221 to the charge pump 222a.

In an example, the charge pump 222a may generate a negative voltage of the same size as that of the voltage inputted to the charge pump 222a.

According to an embodiment of the disclosure, in operation 713, the organic light emitting display device 100 (for example, the processor (for example, the processor 140 of FIG. 3)) may convert the first voltage supplied through the charge pump 222a into the second voltage which has the same size as that of the first voltage and has an inverted phase.

According to an embodiment of the disclosure, in operation 715, the organic light emitting display device 100 (for example, the processor (for example, the processor 140 of FIG. 3)) may output the converted second voltage to a display driver IC (for example, the display driver IC 120a of FIG. 6).

In an embodiment of the disclosure, the display PMIC (for example, the display PMIC 130a) may generate a transistor on voltage VGL 242a and/or a negative initialization voltage VINT_N 243a by stepping down the second voltage supplied from the charge pump 222a or the second regulator 222b through at least one regulator (for example, the second LDO regulator 232a or the third LDO regulator 233a of FIG. 6).

Figure 8:
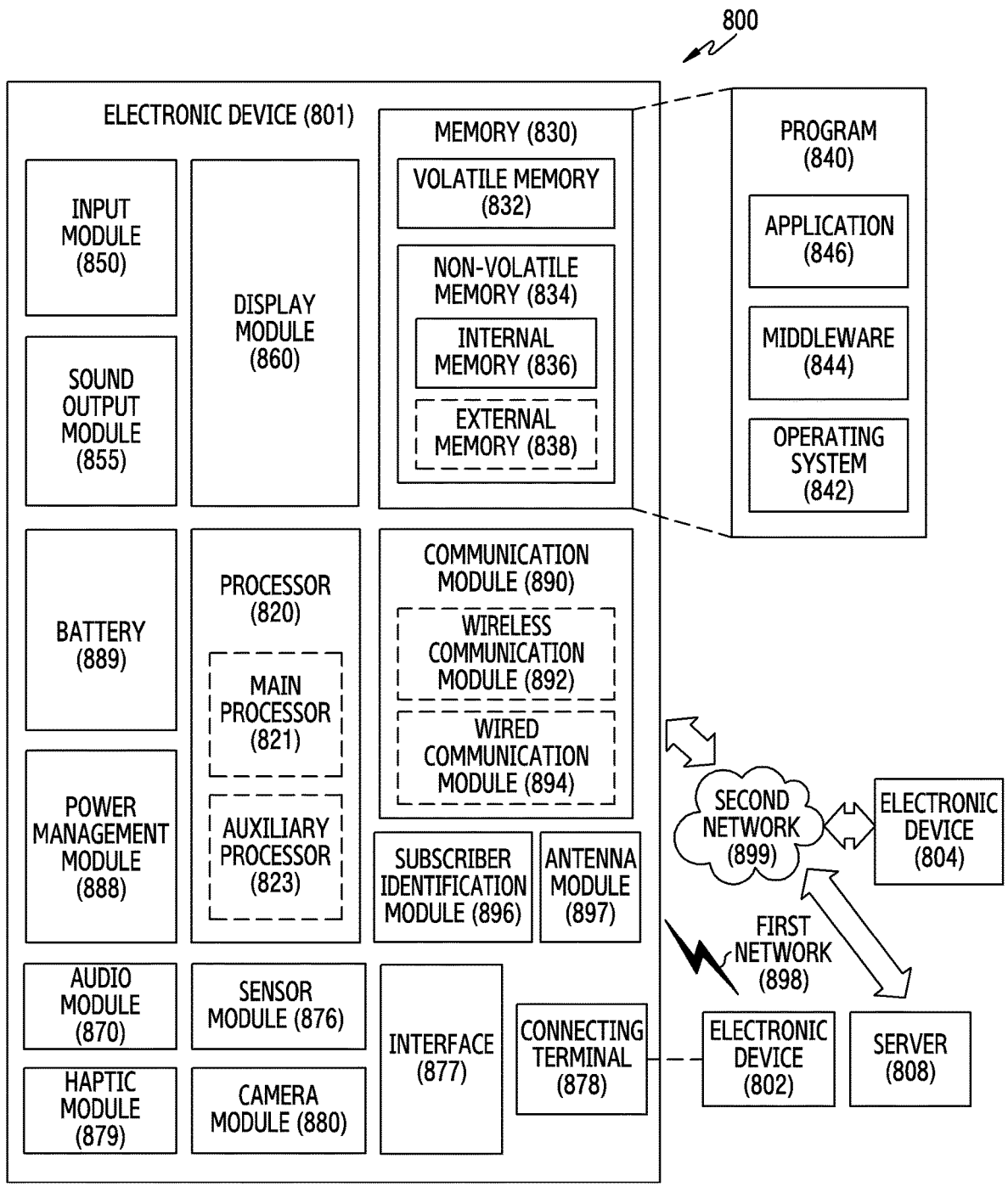
FIG. 8 is a block diagram of an electronic device in a network environment according to an embodiment of the disclosure.

FIG. 8 is a block diagram illustrating an electronic device in a network environment according to an embodiment of the disclosure.

Referring to FIG. 8, an electronic device 801 in a network environment 800 may communicate with an external electronic device 802 via a first network 898 (e.g., a short-range wireless communication network), or an external electronic device 804 or a server 808 via a second network 899 (e.g., a long-range wireless communication network). The electronic device 801 may include the organic light emitting display device 100 (for example, a display module 860 of FIG. 8). According to an embodiment of the disclosure, the electronic device 801 may communicate with the external electronic device 804 via the server 808. According to an embodiment of the disclosure, the electronic device 801 may include a processor 820, a memory 830, an input module 850, a sound output module 855, the display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments of the disclosure, at least one of the components (e.g., the connecting terminal 878) may be omitted from the electronic device 801, or one or more other components may be added in the electronic device 801. In some embodiments of the disclosure, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment of the disclosure, as at least part of the data processing or computation, the processor 820 may store a command or data received from another component (e.g., the sensor module 876 or the communication module 890) in a volatile memory 832, process the command or the data stored in the volatile memory 832, and store resulting data in a non-volatile memory 834. According to an embodiment of the disclosure, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., a sleep) state, or together with the main processor 821 while the main processor 821 is in an active state (e.g., executing an application). According to an embodiment of the disclosure, the auxiliary processor 823 (e.g., an image signal processor or a communication processor) may be implemented as part of another component (e.g., the camera module 880 or the communication module 890) functionally related to the auxiliary processor 823. According to an embodiment of the disclosure, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by other component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving calls. According to an embodiment of the disclosure, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment of the disclosure, the display module 860 may include a touch sensor adapted to detect a touch, or a pressure sensor adapted to measure the intensity of force incurred by the touch.

The audio module 870 may convert a sound into an electrical signal and vice versa. According to an embodiment of the disclosure, the audio module 870 may obtain the sound via the input module 850, or output the sound via the sound output module 855 or a headphone of an external electronic device (e.g., the external electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment of the disclosure, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the external electronic device 802) directly (e.g., wiredly) or wirelessly. According to an embodiment of the disclosure, the interface 877 may include, for example, a high definition multimedia interface (HDMI), a universal serial bus (USB) interface, a secure digital (SD) card interface, or an audio interface.

The connecting terminal 878 may include a connector via which the electronic device 801 may be physically connected with the external electronic device (e.g., the external electronic device 802). According to an embodiment of the disclosure, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 879 may include, for example, a motor, a piezoelectric element, or an electric stimulator.

The camera module 880 may capture a still image or moving images. According to an embodiment of the disclosure, the camera module 880 may include one or more lenses, image sensors, image signal processors, or flashes.

The power management module 888 may manage power supplied to the electronic device 801. According to one embodiment of the disclosure, the power management module 888 may be implemented as at least part of, for example, a power management integrated circuit (PMIC).

The battery 889 may supply power to at least one component of the electronic device 801. According to an embodiment of the disclosure, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the external electronic device 802, the external electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment of the disclosure, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the external electronic device 804), or a network system (e.g., the second network 899). According to an embodiment of the disclosure, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment of the disclosure, the antenna module 897 may include an antenna including a radiating element including a conductive material or a conductive pattern formed in or on a substrate (e.g., a printed circuit board (PCB)). According to an embodiment of the disclosure, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment of the disclosure, another component (e.g., a radio frequency integrated circuit (RFIC)) other than the radiating element may be additionally formed as part of the antenna module 897.

According to various embodiments of the disclosure, the antenna module 897 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 801 and the external electronic device 804 via the server 808 coupled with the second network 899. Each of the external electronic devices 802 or 804 may be a device of a same type as, or a different type, from the electronic device 801. According to an embodiment of the disclosure, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 804 may include an internet-of-things (IoT) device. The server 808 may be an intelligent server using machine learning and/or a neural network. According to an embodiment of the disclosure, the external electronic device 804 or the server 808 may be included in the second network 899. The electronic device 801 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 840) including one or more instructions that are stored in a storage medium (e.g., an internal memory 836 or an external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to various embodiments of the disclosure, there is provided an electronic device including: an organic light emitting display device including: a display panel including a plurality of gate lines, a plurality of data lines, and a plurality of pixels; and a display driver IC (DDI) configured to drive the display panel; and a display power management IC (PMIC) configured to generate a voltage necessary for driving the display driver IC, wherein the display PMIC includes: a first regulator configured to output a first voltage resulting from conversion of a size of an input voltage inputted to the display PMIC; and a second regulator configured to output a second voltage resulting from inversion of a phase of the input voltage and conversion of the size, wherein the display driver IC is configured to: receive at least one of the first voltage or the second voltage; to output, to the display panel, a third voltage in which the phase of the input voltage is maintained based on the first voltage; and to output, to the display panel, a fourth voltage in which the phase of the input voltage is inverted based on the second voltage.

According to an embodiment of the disclosure, the second regulator may include a buck-boost converter or a Cuk converter.

According to an embodiment of the disclosure, the first regulator may include a boost regulator.

According to an embodiment of the disclosure, the electronic device may further include at least one processor electrically connected with the display panel, the display PMIC, and the display driver IC, and the display PMIC may further include a charge pump configured to output a voltage having an inverted phase on the input voltage, and the at least one processor may determine the first voltage to be outputted through the first regulator and the second voltage to be outputted through the second regulator, may convert an input voltage supplied through the first regulator into the first voltage, may determine whether a size of the determined first voltage and a size of the second voltage are the same, when the size of the first voltage and the size of the second voltage are the same, may disable the second regulator and may enable the charge pump, may supply the converted first voltage to the charge pump, may convert the first voltage supplied through the charge pump into the second voltage which has the same size as that of the first voltage and has an inverted phase, and may output the second voltage to the display driver IC.

According to an embodiment of the disclosure, the at least one processor may enable the second regulator to output the second voltage in response to it being determined that the size of the first voltage and the size of the second voltage are different.

According to an embodiment of the disclosure, the display driver IC may further include at least one regulator, and the display driver IC may convert the first voltage into the third voltage by stepping down the first voltage through the at least one regulator, or may convert the second voltage into the fourth voltage by stepping down the second voltage.

According to an embodiment of the disclosure, the at least one regulator included in the display driver IC may include a low voltage dropout (LDO) regulator.

According to an embodiment of the disclosure, the third voltage may include a transistor off voltage (voltage of gate high (VGH)), and the fourth voltage may include at least one of a transistor on voltage (voltage of gate low (VGL)) or a negative initialization voltage (VINT_N).

According to an embodiment of the disclosure, the electronic device may further include a communication circuit, and the display driver IC may transmit, to the display PMIC through the communication circuit, a control signal which includes at least one of the first voltage converted by the first regulator or the second voltage converted by the second regulator.

According to an embodiment of the disclosure, the communication circuit may use at least one communication method of Vx1 communication, I2C communication, universal asynchronous receiver-transmitter (UART) communication, GPIO communication, transition minimized differential signaling (TMDS) communication.

According to various embodiments of the disclosure, there is provided an organic light emitting display device including: a display panel including a plurality of gate lines, a plurality of data lines, and a plurality of pixels, a display driver IC (DDI) configured to drive the display panel, and a display power management IC (PMIC) configured to generate a voltage necessary for driving the display driver IC, wherein the display PMIC includes a first regulator configured to output a first voltage resulting from conversion of a size of an input voltage inputted to the display PMIC, and a second regulator configured to output a second voltage resulting from inversion of a phase of the input voltage and conversion of the size, wherein the display driver IC is configured to receive at least one of the first voltage or the second voltage, to output, to the display panel, a third voltage in which the phase of the input voltage is maintained based on the first voltage, and to output, to the display panel, a fourth voltage in which the phase of the input voltage is inverted based on the second voltage.

According to an embodiment of the disclosure, the second regulator may include a buck-boost converter or a Cuk converter.

According to an embodiment of the disclosure, the first regulator may include a boost regulator.

According to an embodiment of the disclosure, the organic light emitting display device may further include at least one processor electrically connected with the display panel, the display PMIC, and the display driver IC, and the display PMIC may further include a charge pump configured to output a voltage having an inverted phase on the input voltage, and the at least one processor may determine the first voltage to be outputted through the first regulator and the second voltage to be outputted through the second regulator, may convert an input voltage supplied through the first regulator into the first voltage, may determine whether a size of the determined first voltage and a size of the second voltage are the same, when the size of the first voltage and the size of the second voltage are the same, may disable the second regulator and may enable the charge pump, may supply the converted first voltage to the charge pump, may convert the first voltage supplied through the charge pump into the second voltage which has the same size as that of the first voltage and has an inverted phase, and may output the second voltage to the display driver IC.

According to an embodiment of the disclosure, the at least one processor may enable the second regulator to output the second voltage in response to it being determined that the size of the first voltage and the size of the second voltage are different.

According to an embodiment of the disclosure, the display driver IC may further include at least one regulator, and the display driver IC may convert the first voltage into the third voltage by stepping down the first voltage through the at least one regulator, or may convert the second voltage into the fourth voltage by stepping down the second voltage.

According to an embodiment of the disclosure, the at least one regulator included in the display driver IC may include a low voltage dropout (LDO) regulator.

According to an embodiment of the disclosure, the third voltage may include a transistor off voltage (voltage of gate high (VGH)), and the fourth voltage may include at least one of a transistor on voltage (voltage of gate low (VGL)) or a negative initialization voltage (VINT_N).

According to an embodiment of the disclosure, the organic light emitting display device may further include a communication circuit, and the display driver IC may transmit, to the display PMIC through the communication circuit, a control signal which includes at least one of the first voltage converted by the first regulator or the second voltage converted by the second regulator.

According to an embodiment of the disclosure, the communication circuit may use at least one communication method of Vx1 communication, I2C communication, UART communication, GPIO communication, TMDS communication.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an organic light emitting display device comprising:
a display panel comprising a plurality of gate lines, a plurality of data lines, and a plurality of pixels; and
a display driver integrated circuit (IC) (DDI) configured to drive the display panel; and
a display power management IC (PMIC) configured to generate a voltage necessary for driving the display driver IC,
wherein the display PMIC comprises:
a first regulator configured to output a first voltage resulting from conversion of a size of an input voltage inputted to the display PMIC, and
a second regulator configured to output a second voltage resulting from inversion of a phase of the input voltage and conversion of the size, and
wherein the display driver IC is configured to:
receive at least one of the first voltage or the second voltage,
output, to the display panel, a third voltage in which the phase of the input voltage is maintained based on the first voltage, and
output, to the display panel, a fourth voltage in which the phase of the input voltage is inverted based on the second voltage.

2. The electronic device of claim 1,
wherein the first regulator comprises a boost regulator, and wherein the second regulator comprises at least one of a buck-boost converter or a Cuk converter.

3. The electronic device of claim 1, further comprising:
at least one processor electrically connected with the display panel, the display PMIC, and the display driver IC,
wherein the display PMIC further comprises a charge pump configured to output a voltage having an inverted phase on the input voltage, and
wherein the at least one processor is configured to:
determine the first voltage to be outputted through the first regulator and the second voltage to be outputted through the second regulator,
convert an input voltage supplied through the first regulator into the first voltage,
determine whether a size of the determined first voltage and a size of the second voltage are the same,
when the size of the first voltage and the size of the second voltage are the same, disable the second regulator and enable the charge pump,
supply the converted first voltage to the charge pump,
convert the first voltage supplied through the charge pump into the second voltage which has a same size as that of the first voltage and has an inverted phase, and
output the second voltage to the display driver IC.

4. The electronic device of claim 3, wherein the at least one processor is further configured to enable the second regulator to output the second voltage in response to it being determined that the size of the first voltage and the size of the second voltage are different.

5. The electronic device of claim 1,
wherein the display driver IC further comprises at least one regulator, and
wherein the display driver IC is configured to:
convert the first voltage into the third voltage by stepping down the first voltage through the at least one regulator, or
convert the second voltage into the fourth voltage by stepping down the second voltage.

6. The electronic device of claim 5, wherein the at least one regulator included in the display driver IC comprises a low voltage dropout (LDO) regulator.

7. The electronic device of claim 5,
wherein the third voltage comprises a transistor off voltage (voltage of gate high (VGH)), and
wherein the fourth voltage comprises at least one of a transistor on voltage (voltage of gate low (VGL)) or a negative initialization voltage (VINT_N).

8. The electronic device of claim 1, further comprising:
a communication circuit which uses at least one communication method of V×1 communication, inter-integrated circuit (I2C) communication, universal asynchronous receiver-transmitter (UART) communication, general purpose input and output (GPIO) communication, transition minimized differential signaling (TMDS) communication,
wherein the display driver IC is configured to transmit, to the display PMIC through the communication circuit, a control signal which includes at least one of the first voltage converted by the first regulator or the second voltage converted by the second regulator.

9. An organic light emitting display device comprising:
a display panel comprising:
a plurality of gate lines,
a plurality of data lines, and
a plurality of pixels;
a display driver integrated circuit (IC) (DDI) configured to drive the display panel; and
a display power management IC (PMIC) configured to generate a voltage necessary for driving the display driver IC,
wherein the display PMIC comprises:
a first regulator configured to output a first voltage resulting from conversion of a size of an input voltage inputted to the display PMIC, and
a second regulator configured to output a second voltage resulting from inversion of a phase of the input voltage and conversion of the size, and wherein the display driver IC is configured to
receive at least one of the first voltage or the second voltage,
output, to the display panel, a third voltage in which the phase of the input voltage is maintained based on the first voltage, and
output, to the display panel, a fourth voltage in which the phase of the input voltage is inverted based on the second voltage.

10. The organic light emitting display device of claim 9,
wherein the first regulator comprises a boost regulator, and
wherein the second regulator comprises at least one of a buck-boost converter or a Cuk converter.

11. The organic light emitting display device of claim 9, further comprising:
at least one processor electrically connected with the display panel, the display PMIC, and the display driver IC,
wherein the display PMIC further comprises a charge pump configured to output a voltage having an inverted phase on the input voltage, and
wherein the at least one processor is configured to:
determine the first voltage to be outputted through the first regulator and the second voltage to be outputted through the second regulator,
convert an input voltage supplied through the first regulator into the first voltage,
determine whether a size of the determined first voltage and a size of the second voltage are the same,
when the size of the first voltage and the size of the second voltage are the same, disable the second regulator and enable the charge pump,
supply the converted first voltage to the charge pump,
convert the first voltage supplied through the charge pump into the second voltage which has a same size as that of the first voltage and has an inverted phase, and
output the second voltage to the display driver IC.

12. The organic light emitting display device of claim 11, wherein the at least one processor is further configured to enable the second regulator to output the second voltage in response to it being determined that the size of the first voltage and the size of the second voltage are different.

13. The organic light emitting display device of claim 9,
wherein the display driver IC further comprises at least one regulator,
wherein the display driver IC is configured to:
convert the first voltage into the third voltage by stepping down the first voltage through the at least one regulator, or
convert the second voltage into the fourth voltage by stepping down the second voltage, and
wherein the at least one regulator comprises a low voltage dropout (LDO) regulator.

14. The organic light emitting display device of claim 13,
wherein the third voltage comprises a transistor off voltage (voltage of gate high (VGH)), and
wherein the fourth voltage comprises at least one of a transistor on voltage (voltage of gate low (VGL)) or a negative initialization voltage (VINT_N).

15. The organic light emitting display device of claim 9, further comprising:
a communication circuit which uses at least one communication method of V×1 communication, inter-integrated circuit (I2C) communication, universal asynchronous receiver-transmitter (UART) communication, general purpose input and output (GPIO) communication, transition minimized differential signaling (TMDS) communication,
wherein the display driver IC is configured to transmit, to the display PMIC through the communication circuit, a control signal which includes at least one of the first voltage converted by the first regulator or the second voltage converted by the second regulator.

16. At least one non-transitory computer readable storage medium storing one or more programs including instructions, which when executed by a processor of an electronic device, perform a method of:
outputting, by a first regulator of a display power management integrated circuit (IC) (PMIC) included in the electronic device, a first voltage resulting from conversion of a size of an input voltage inputted to the PMIC;
outputting, by a second regulator of the PMIC, a second voltage resulting from inversion of a phase of the input voltage and conversion of the size;
receiving, by a display driver IC (DDI) of a display included in the electronic device, at least one of the first voltage or the second voltage;
outputting, to a display panel, a third voltage in which the phase of the input voltage is maintained based on the first voltage; and
outputting, to the display panel, a fourth voltage in which the phase of the input voltage is inverted based on the second voltage.

17. The at least one non-transitory computer readable storage medium of claim 16,
wherein the first regulator comprises a boost regulator, and
wherein the second regulator comprises at least one of a buck-boost converter or a Cuk converter.

18. The at least one non-transitory computer readable storage medium of claim 16, further comprising:
determining the first voltage to be outputted through the first regulator and the second voltage to be outputted through the second regulator;
converting an input voltage supplied through the first regulator into the first voltage;
determining whether a size of the determined first voltage and a size of the second voltage are the same;
when the size of the first voltage and the size of the second voltage are the same, disabling the second regulator and enabling a charge pump;
supplying the converted first voltage to the charge pump;
converting the first voltage supplied through the charge pump into the second voltage which has a same size as that of the first voltage and has an inverted phase; and
outputting the second voltage to the display driver IC.

19. The at least one non-transitory computer readable storage medium of claim 18, further comprising:
enabling the second regulator to output the second voltage in response to it being determined that the size of the first voltage and the size of the second voltage are different.

20. The at least one non-transitory computer readable storage medium of claim 16, further comprising:
converting, by the display driver IC, the first voltage into the third voltage by stepping down the first voltage through one of the first regulator or the second regulator; or
converting, by the display driver IC, the second voltage into the fourth voltage by stepping down the second voltage.

* * * * *